(No Model.)

J. B. ELLIOTT.
BICYCLE RIDING PLATFORM.

No. 288,414. Patented Nov. 13, 1883.

WITNESSES:

INVENTOR:
J. B. Elliott
BY
ATTORNEYS.

United States Patent Office.

JAMES B. ELLIOTT, OF LONDON, ENGLAND.

BICYCLE RIDING-PLATFORM.

SPECIFICATION forming part of Letters Patent No. 288,414, dated November 13, 1883.

Application filed April 3, 1883. (No model.)

*To all whom it may concern:*

Be it known that I, JAMES B. ELLIOTT, of London, England, have invented a new and Improved Bicycle Riding-Platform, of which the following is a full, clear, and exact description.

The object of my invention is to provide a new and improved platform for fancy performances on the bicycle; and the invention consists in a platform adapted to revolve in the horizontal plane, on which platform the bicycle is operated, whereby the platform will be rotated backward from the bicycle and the rider will make no headway, thus producing some very novel and comic effects.

Reference is to be had to the accompanying drawings, forming part of this specification, in which similar letters of reference indicate corresponding parts in both figures.

Figure 1:
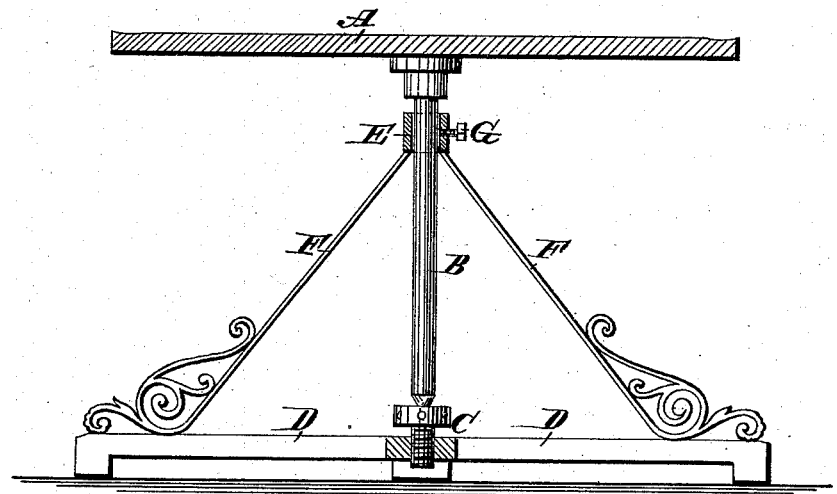
Figure 2:
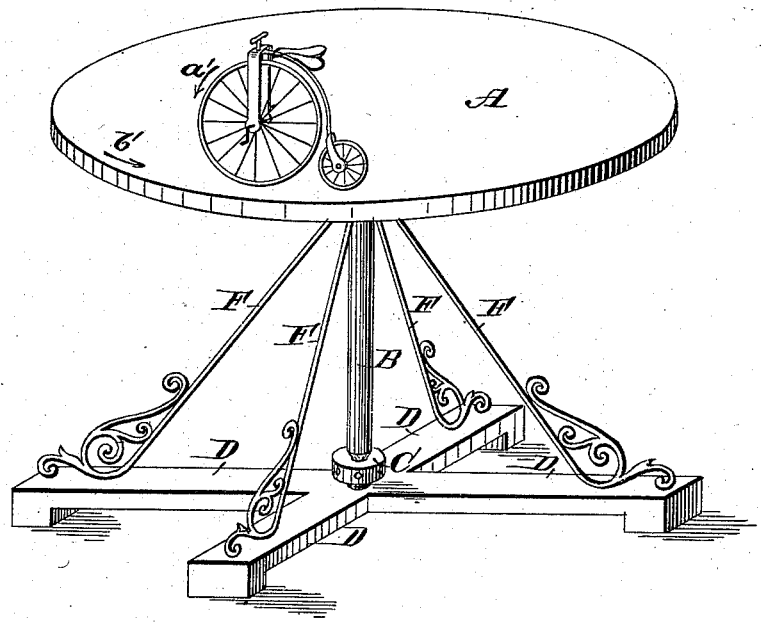

Figure 1 is a cross-sectional elevation of my improved bicycle riding-platform, and Fig. 2 is a perspective view of the same.

A circular platform, A, about six to nine feet in diameter, is provided at the middle with a downwardly-projecting spindle, B, which is securely fastened to the platform. The lower end of the spindle is pointed or arranged with any other suitable step, to decrease the friction as much as possible. The pointed end of the spindle rests upon a bearing, C, secured to a suitable base-frame, D. The spindle A passes through a guide-collar, E, held in the upper ends of a series of brace-rods, F, secured at the lower ends on the base D. When the pointed end of the spindle rests on the bearing C, the collar E will be at or near the upper end of the spindle. The bearing is provided with a screw, by means of which it can be adjusted higher or lower. The spindle can rotate freely in the collar E and on the bearing C, and the platform A, attached to the spindle, rotates with it. The collar E is provided with a binding-screw, G, for locking the spindle in place in case the same is not to rotate.

The bicycle is placed on the platform, and the operator turns the wheel in the usual manner. The platform is covered with emery-cloth, leather, or other suitable material to increase the friction. If the wheel of the bicycle is rotated in the direction of the arrow $a'$, the platform A will be rotated in the direction of the arrow $b'$ by the wheel of the bicycle, and the faster the bicycle-wheel is rotated the faster the platform A will be rotated. The rider can make no headway, and always remains on the same spot, for as the bicycle-wheel rotates the platform the bicycle can never move forward. If the platform is held, the bicycle-rider can run around it in a circle, but as soon as the platform is released it is revolved.

One or more bicycles can be operated at the same time on the platform.

Various novel performances can be produced with the bicycle on my improved platform.

It is evident that tricycles and quadricycles can be used on the platform as well as bicycles.

If desired, the spindle can be surrounded by a fancy leg to conceal it.

Having thus described my invention, I claim as new and desire to secure by Letters Patent—

In a platform for bicycle performances, the combination of the table A, having the central end-beveled spindle, B, the screw-bearing C, the base D, the guide-collar E, and the brace-rods F, as shown and described.

JAMES B. ELLIOTT.

Witnesses:
 OSCAR F. GUNZ,
 C. SEDGWICK.